United States Patent
Doddi et al.

(10) Patent No.: US 10,262,271 B1
(45) Date of Patent: Apr. 16, 2019

(54) SYSTEMS AND METHODS FOR MODELING MACHINE LEARNING AND DATA ANALYTICS

(71) Applicant: DataTron Technologies, Inc., San Francisco, CA (US)

(72) Inventors: Harish Doddi, San Francisco, CA (US); Jerry Xu, Cupertino, CA (US)

(73) Assignee: DataTron Technologies Inc., San Francisco, CA (US)

( * ) Notice: Subject to any disclaimer, the term of this patent is extended or adjusted under 35 U.S.C. 154(b) by 0 days.

(21) Appl. No.: 15/896,618

(22) Filed: Feb. 14, 2018

(51) Int. Cl.
*G06N 5/04* (2006.01)
*G06F 3/0484* (2013.01)
*G06N 99/00* (2019.01)

(52) U.S. Cl.
CPC ........... *G06N 5/041* (2013.01); *G06F 3/0484* (2013.01); *G06N 99/005* (2013.01)

(58) Field of Classification Search
None
See application file for complete search history.

(56) References Cited

U.S. PATENT DOCUMENTS

| | | | |
|---|---|---|---|
| 7,480,640 B1* | 1/2009 | Elad | G06Q 10/10 706/14 |
| 2005/0234761 A1* | 10/2005 | Pinto | G06F 17/50 705/7.28 |
| 2015/0339572 A1* | 11/2015 | Achin | G06N 5/02 706/46 |
| 2017/0006135 A1* | 1/2017 | Siebel | H04L 67/02 |
| 2017/0017903 A1* | 1/2017 | Gray | G06N 99/005 |
| 2017/0124487 A1* | 5/2017 | Szeto | G06N 7/005 |

* cited by examiner

*Primary Examiner* — Alan Chen
(74) *Attorney, Agent, or Firm* — Goodwin Procter LLP

(57) ABSTRACT

Systems and methods for implementing and using a data modeling and machine learning lifecycle management platform that facilitates collaboration among data engineering, development and operations teams and provides capabilities to experiment using different models in a production environment to accelerate the innovation cycle. Stored computer instructions and processors instantiate various modules of the platform. The modules include a user interface, a collector module for accessing various data sources, a workflow module for processing data received from the data sources, a training module for executing stored computer instructions to train one or more data analytics models using the processed data, a predictor module for producing predictive datasets based on the data analytics models, and a challenger module for executing multi-sample hypothesis testing of the data analytics models.

26 Claims, 8 Drawing Sheets

All Workspaces

| Name | Created On | Created By | Last Modified On | Last Modified By | Options |
|---|---|---|---|---|---|
| ↕ Emma Workspace | Aug 28th 2017, 6:42:57 pm | Admin | Aug 28th 2017, 6:42:57 pm | Akshay | |
| ↕ Game Ticket Pricing | Nov 1st 2017, 7:11:23 pm | Admin | Nov 1st 2017, 7:11:23 pm | Akshay | |
| ↕ Ticketing Recent Data Workspace | Nov 8th 2017, 11:40:22 am | Admin | Nov 8th 2017, 11:40:22 am | Akshay | |
| ↕ Story_1_Data_Preparation | Nov 8th 2017, 11:29:30 pm | Admin | Nov 8th 2017, 11:29:30 pm | Admin | |
| ↕ Story_2_Model_Building | Nov 9th 2017, 12:26:46 am | Admin | Nov 9th 2017, 12:26:46 am | Admin | |
| ↕ Story_3_Multiple_Models | Nov 9th 2017, 12:27:59 am | Admin | Nov 9th 2017, 12:27:59 am | Admin | |
| ↕ Story_4_Streaming_Data | Nov 9th 2017, 12:28:17 am | Admin | Nov 9th 2017, 12:28:17 am | Admin | |
| ↕ Story_5_Challenger_Models | Nov 29th 2017, 7:42:56 pm | Admin | Nov 29th 2017, 7:42:56 pm | Admin | |

FIG. 2

Create/Edit Workflow Manager

Name: _____ 604

Description: _____ 608

Machine Type:

| Extra-small | Small | Medium | Large | GPU |
|---|---|---|---|---|
| 1 CPU / 1 GB RAM | 4 CPU / 16 GB RAM | 16 CPU / 128 GB RAM | 32 CPU / 256 GB RAM | 32 CPU 8 GPU/ 488 GB RAM |

612

No of Machines: 1

Active: OFF

Schedule (Cron): 0 0 * * *
                 min hr day (month) month day (week)

Configure Email: OFF

616

Cancel    Save

FIG. 6

SYSTEMS AND METHODS FOR MODELING MACHINE LEARNING AND DATA ANALYTICS

FIELD OF INVENTION

The present disclosure relates generally to systems and techniques for data analysis. Some embodiments relate specifically to systems and techniques for using an interactive service-based platform to model and test data models.

BACKGROUND

Many organizations and individuals use electronic data to improve their operations or aid their decision-making. For example, many business enterprises use data management technologies to enhance the efficiency of various business processes, such as executing transactions, tracking inputs and outputs, pricing or marketing products. As another example, many businesses use operational data to evaluate performance of business processes, to measure the effectiveness of efforts to improve processes, or to decide how to adjust processes.

The sheer volume of data available through transactional logs, social media, web traffic and other sources provides many opportunities to become a data driven organization. Moreover, the ability to model and learn from the data allows entities to adapt to changing environments and situations. However, to capitalize on this data is not that straightforward, and often requires highly-skilled data scientists to build and test models, and the process of using large, diverse and dynamic datasets to derive insights is tedious, costly and time consuming. Further, the process of consuming data from different sources and changing data requirements is an added overhead in the project which can affect development and implementation timelines. As such, many business entities are incapable of modeling the business problem, building and testing models that address the problem, and producing actionable results without highly specialized experts.

A systematic analytical platform needs to be established in order to define, develop, deploy and manage models with respect to problem to be solved.

SUMMARY OF THE INVENTION

Data analysts can use analytic techniques and computational infrastructures to build predictive models from electronic data, including operations and evaluation data. Embodiments of the invention provide a machine learning lifecycle management platform to facilitate the model development process—from feature engineering to production deployment. The platform facilitates collaboration among data engineering, development and operations teams and provides capabilities to experiment using different models in a production environment to accelerate the innovation cycle.

According to a first aspect of the present disclosure, a system for executing data analytics comprises one or more processors and a memory coupled with the one or more processors, wherein the processor executes a plurality of modules stored in the memory. The modules include a user interface, a collector module, a workflow module, a training module a predictor module, and a challenger module. The user interface module is used to model and manage a data analytics plan, and displays various processing nodes. The processing nodes include one or more collector nodes, one or more workflow manager nodes, one or more training nodes, one or more predictor nodes and one or more challenger nodes. The collector module provides access to data sources, each data source providing data for use in training and executing the data analytics plan, and each instantiation of a collector module is presented as a collector nodes in the user interface. The workflow module processes the data prior to its use in training and executing the data analytics plan, and each instantiation of a workflow module is presented as a workflow manager node in the user interface. The training module executes stored computer instructions to train one or more data analytics models using the processed data, and each instantiation of a training module is presented as a training manager nodes in the user interface. The predictor module produces predictive datasets based on the data analytics models, and each instantiation of the predictor modules is presented as a predictor nodes in the user interface. The challenger module executes multi-sample hypothesis testing of the data analytics models, and each instantiation of a challenger module is presented as a challenger nodes in the user interface.

In some embodiments, the system also includes a publishing module which publishes the results calculated by the predictor module, and each instantiation of a publishing module is presented as a publisher node in the user interface. In some instances, the data sources may be static data sources accessed using an application programming interface to an external computing system, and in some cases the data sources are real-time data streaming sources providing transactional data. In some cases, both static and real-time data sources may be used as sources of data for the data analytics models.

In some embodiments, the workflow module implements a series of tasks, each task performing a discrete operation on the data, such as data filtering, data aggregation, data selection, data parsing and/or data normalization. In some versions, a subordinate user interface is used to construct and present a directed acyclic graph that includes the tasks represented by vertices in the directed acyclic graph and possible paths of the data represented as edges in the directed acyclic graph. In some cases, an instance of the workflow module may be assigned to a specified processor such that the series tasks associated with the instance of the workflow module are executed on the specified processor. Such assignments may be designated by a user, and/or selected automatically based on an estimated data processing load of the series of tasks.

In some embodiments, the multi-sample hypothesis testing comprises executing two or more of the data analytics models, and in some cases allocating a subset of the data to one of the models, and another subset of the data to another model. The allocation of the data may be based on designating a percentage of the data to each of the models, allocating substantially all of the data to a first model and, upon receiving an indication the first model is not performing, sending substantially all of the data to a second model or allocating substantially all of the data to each model in parallel and designating a priority for at least one of the two or more models.

Another aspect of the invention provides a method for performing data analytics. The method includes displaying, on a user interface for modeling and managing a data analytics plan, various processing nodes, including collector nodes, workflow manager nodes, training nodes, predictor nodes and challenger nodes. The method also includes: accessing data sources, each data source providing data for use in training and executing the data analytics plan and presenting each data access process as a collector node in the user interface; processing the data prior to its use in training and executing the data analytics plan and presenting each processing step as a workflow manager node in the user interface; training data analytics models using the processed data and presenting each training step as a training manager node in the user interface; producing predictive datasets based on the data analytics models and presenting each production step as a predictor nodes in the user interface; and executing multi-sample hypothesis testing of the data analytics models and presenting the testing steps as challenger nodes in the user interface.

In some embodiments, the results calculated by the predictor module are published, and each publication is presented as a publisher node in the user interface. In some instances, the data sources may be static data sources accessed using an application programming interface to an external computing system, and in some cases the data sources are real-time data streaming sources providing transactional data. In some cases, both static and real-time data sources may be used as sources of data for the data analytics models.

In some embodiments, a series of tasks are used to represent discrete operations performed on the data, such as data filtering, data aggregation, data selection, data parsing and/or data normalization. In some versions, a subordinate user interface is provided to construct and present a directed acyclic graph that includes the tasks represented by vertices in the directed acyclic graph and possible paths of the data represented as edges in the directed acyclic graph. In some cases, the tasks may be assigned to a specified processor such that the series tasks associated with the instance of the workflow module are executed on the specified processor. Such assignments may be designated by a user, and/or selected automatically based on an estimated data processing load of the series of tasks.

In some embodiments, the multi-sample hypothesis testing comprises executing two or more of the data analytics models, and in some cases allocating a subset of the data to one of the models, and another subset of the data to another model. The allocation of the data may be based on designating a percentage of the data to each of the models, allocating substantially all of the data to a first model and, upon receiving an indication the first model is not performing, sending substantially all of the data to a second model or allocating substantially all of the data to each model in parallel and designating a priority for at least one of the two or more models.

In another aspect, the subject matter described in this specification relates to an article. The article includes a non-transitory computer-readable medium having instructions stored thereon that, when executed by one or more computer processors, cause the computer processors to perform operations including displaying, on a user interface for modeling and managing a data analytics plan, various processing nodes, including collector nodes, workflow manager nodes, training nodes, predictor nodes and challenger nodes; accessing data sources, each data source providing data for use in training and executing the data analytics plan and presenting each data access process as a collector node in the user interface; processing the data prior to its use in training and executing the data analytics plan and presenting each processing step as a workflow manager node in the user interface; training data analytics models using the processed data and presenting each training step as a training manager node in the user interface; producing predictive datasets based on the data analytics models and presenting each production step as a predictor nodes in the user interface; and executing multi-sample hypothesis testing of the data analytics models and presenting the testing steps as challenger nodes in the user interface.

Elements of embodiments described with respect to a given aspect of the invention can be used in various embodiments of another aspect of the invention. For example, it is contemplated that features of dependent claims depending from one independent claim can be used in apparatus, systems, and/or methods of any of the other independent claims.

BRIEF DESCRIPTION OF THE DRAWINGS

Advantages of the some embodiments may be understood by referring to the following description taken in conjunction with the accompanying drawings. In the drawings, like reference characters generally refer to the same parts throughout the different views. Also, the drawings are not necessarily to scale, emphasis instead generally being placed upon illustrating principles of some embodiments of the invention.

FIG. 2 is a screen capture of a user interface for creating and managing projects within the machine learning lifecycle management platform of FIG. 1 in accordance with various embodiments of the invention.

DETAILED DESCRIPTION

Figure 1:
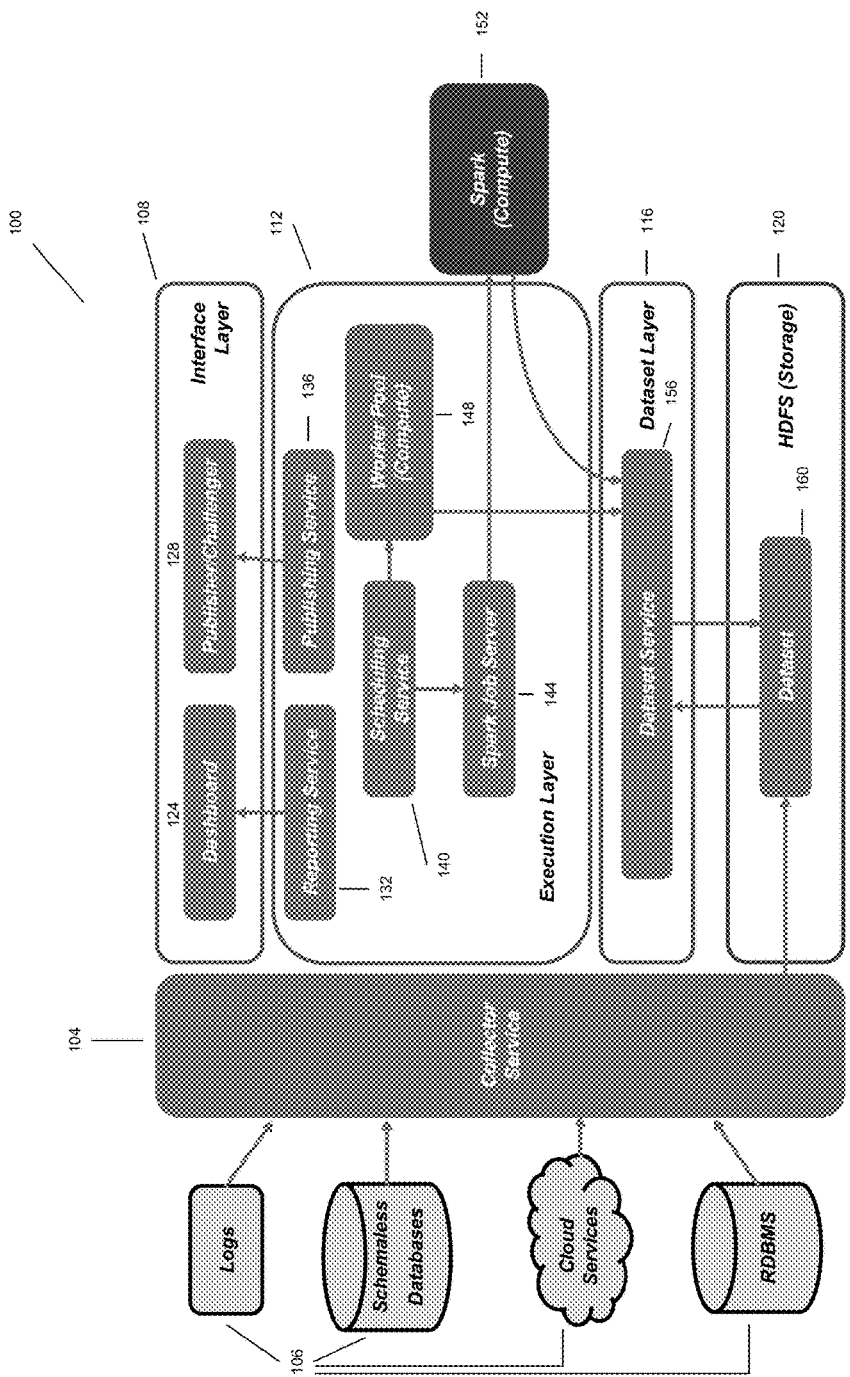
FIG. 1 is an illustrative architecture of a machine learning lifecycle management platform and system in accordance with various embodiments of the invention.

Referring to FIG. 1, in some embodiments a system and platform 100 for building, managing and analyzing various predictive data includes, at a general level, a collector service 104, an interface layer 108, an execution layer 112, a data layer 116 and storage 120. The collector service 104 may implement data collection tasks by connecting to one or more data sources 122. The data sources 122 may be static historical data (e.g., web logs, transaction logs, etc.), traditional relational databases (e.g., Oracle, MySql), schemaless databases (e.g., MongoDB), and/or cloud services providing access to data via an application programming interface ("API") from sources such as Salesforce, Marketo and Stubhub. The connector service can connect to the data sources 106 in either push or pull mode. In push mode, the client application using or providing the data source sends data to the collector service 104 through an API. In pull mode, the collector service connects to the data source 106 at some predefined interval to get the data.

The interface layer 108 provides the user-facing functions for the platform 100. More specifically, the interface layer 108 includes a dashboard 124 that facilitates the creation and organization of projects within the platform 100, and allows a user to monitor task progress, and see log files for troubleshooting. In some cases, the dashboard 124 also monitors machine utilization and health information for all machines in the deployment of the platform 100. The interface layer 108 also includes a publisher/challenger module 128 that facilitates the viewing and publishing of data produced by execution of the models.

The execution layer 112 includes a reporting service 132, a publishing service 136, a scheduling service 140, a job server 144 and a worker pool 148. The reporting service 132 provides the functional and support for the dashboard 124 and connects to the dataset layer 116 in read only mode to gather and serve data to the dashboard 124. The publishing service 136 accepts input features from the client machines and data sources and returns results from the predictive models as they are executed. The publishing service 136 can operate in two different modes—caching mode and direct serving mode. In direct serving mode, a training node (described in greater detail below) is paired with a publisher node (also described in greater detail below). In caching mode, the training node is paired with a predictor node, and the predictor node periodically calculates the system state and model output and caches the results, which are provided on demand to the requesting publisher node. Caching mode may also be used for models that include a streaming data service providing near real-time data into the model and requires frequent processing and/or recalculations.

Still referring to FIG. 1, tasks (importing of data, execution of software programs to implement models, etc.) are scheduled by the scheduling service 140 to be executed by either the spark job server 144 or worker pool 148. The spark job server 144 coordinates assignment of tasks to specific spark machines 152. The worker pool 148 may include varying types and combinations of hardware, operating systems, and functional software such that tasks may be assigned to a particular computational element within the working pool 148 based on parameters of the tasks, its estimated workload, etc. For example, if a task includes highly computational machine-learning or deep-learning models, the task may be assigned to a graphics processing unit (GPU) machine specially designed for such tasks.

The dataset layer 116 includes a dataset service 156 that keeps track of different datasets used as sources for the tasks. For example, the dataset service 156 maintains schema information, revision history, location, size, source, owner, and other parameters for the various data sources 106 used by the system 100. The system stores its data in one or more datasets 160 in the storage layer 120.

In one exemplary deployment of the system, each computing device may have four or more core processors, and sufficient memory and physical storage (e.g., 8 GB memory and 60 GB hard drive. A production deployment may use approximately 25 nodes, having CentOS or RedHat installed as an operating system. In such a deployment, one arrangement provides for using five nodes for a utility cluster, used bootup, instantiate and manage the system 100. Two nodes may be used for the dashboard 124 to view the application portal (described below), one for the scheduling service 140, two for the reporting service 132 (for supporting internal APIs for example), four (or more) for the worker pool 148 to execute code used to implement various data modes, four for the dataset service 156 to upload and download content to and from various cloud-based and/or local data sources, two for the connector service 104, four for the publishing service 136 and one for the spark job server 144 (if using spark jobs). If the system is implemented using a third-party hosted environment (e.g., AWS, Azure, etc.) each machine has the necessary credentials to access the virtual machines at those services. If the data is stored locally, each machine is provided access credentials to the storage layer 120 (using Hadoop or other similar data storage system. In some implementations, the machines are split into private and public clusters using, for example, DCOS methods and terminology. In such cases, the dashboard 124 and publisher 128 are set up as public and accessible on an internal cloud, while the remainder of the machines are set up as private and inaccessible.

FIG. 2 illustrates an initial workspace dashboard 200 for viewing and managing projects within the system 100. Each line 204 of the dashboard represents a unique project, and displays various parameters for each, including, for example, a project name, date created, owner, last modified date, last modified by, and options such as data export and deletion. Selecting one of the projects from the dashboard opens the workspace for that project. New projects can be created, the relevant model code can be uploaded, and assigned to a unique URL in a code repository such as Git. Each workspace contains a single project.

Figure 3:
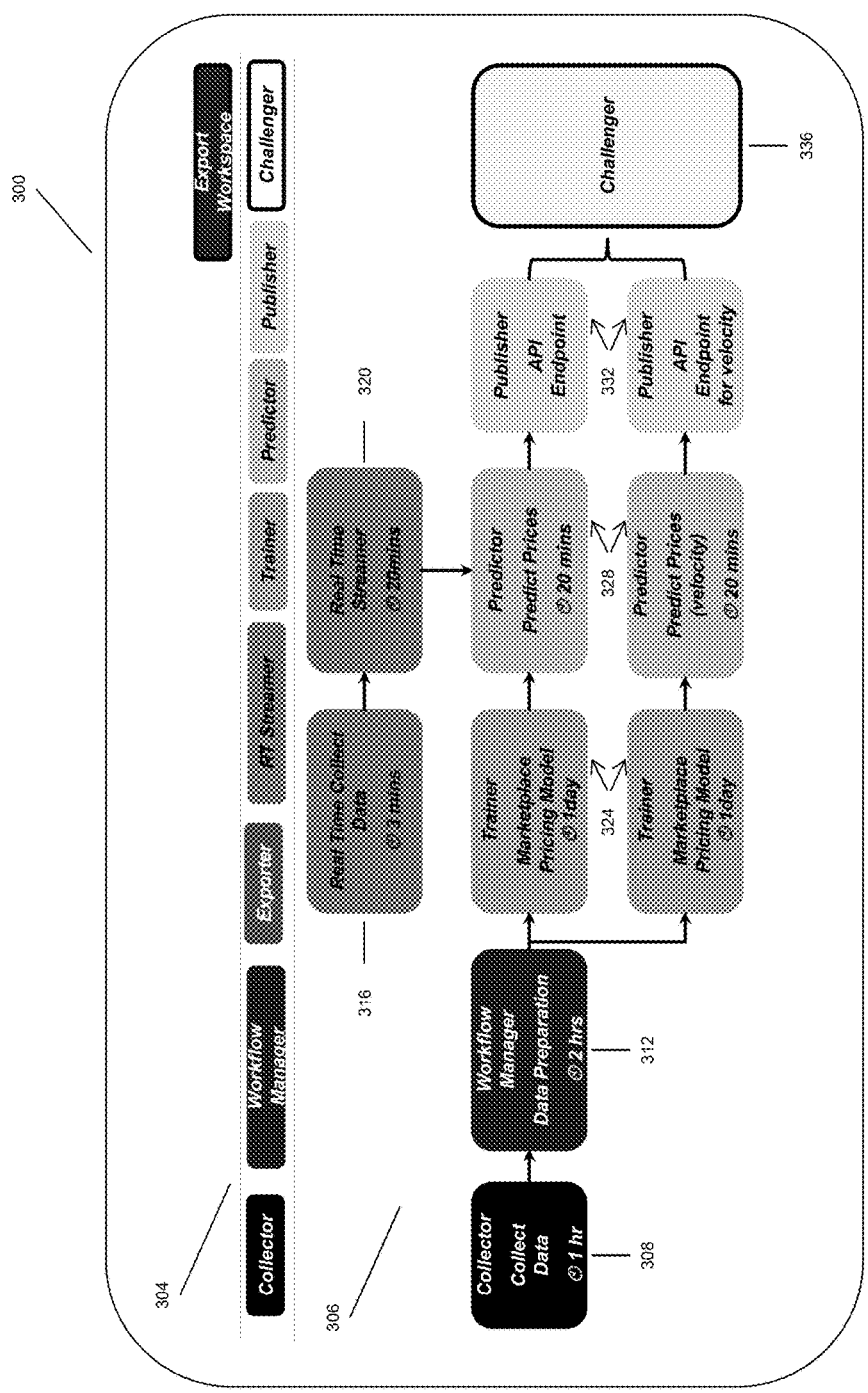
FIG. 3 is a screen capture of a user interface for building a project workflow within the machine learning lifecycle management platform of FIG. 1 in accordance with various embodiments of the invention.

FIG. 3 illustrates a user interface 300 in which a user builds out a project workflow for a project. The interface 300 includes a toolbar 304, having a series of buttons used to instantiate various functional modules represented by particular processing nodes in the project workflow, and a workspace 306 into which the processing nodes are arranged and organized as an acyclic directed graph ("DAG") according to the desired workflow process. The nodes are comprised of a collector nodes 308, workflow manager nodes 312, real-time data collection nodes 316, real time streaming data nodes 320, trainer nodes 324, predictor nodes 328, publisher nodes 332 and challenger nodes 336. While FIG. 3 illustrates a particular number and arrangement of the nodes, those skilled in the art will recognize that many permutations in the number, combination and ordering of the nodes is not germane to the invention. In some embodiments, some or all of the nodes can have tasks, parameters and other functions associated therewith. For example, certain nodes that instantiate data collection tasks may be scheduled such that they execute at some periodicity or frequency to ensure the data used in subsequent steps is current and/or coordinated with other data sources (e.g., data sources with related data may need to be refreshed in a particular order, or simultaneously to ensure accuracy).

Figure 4:
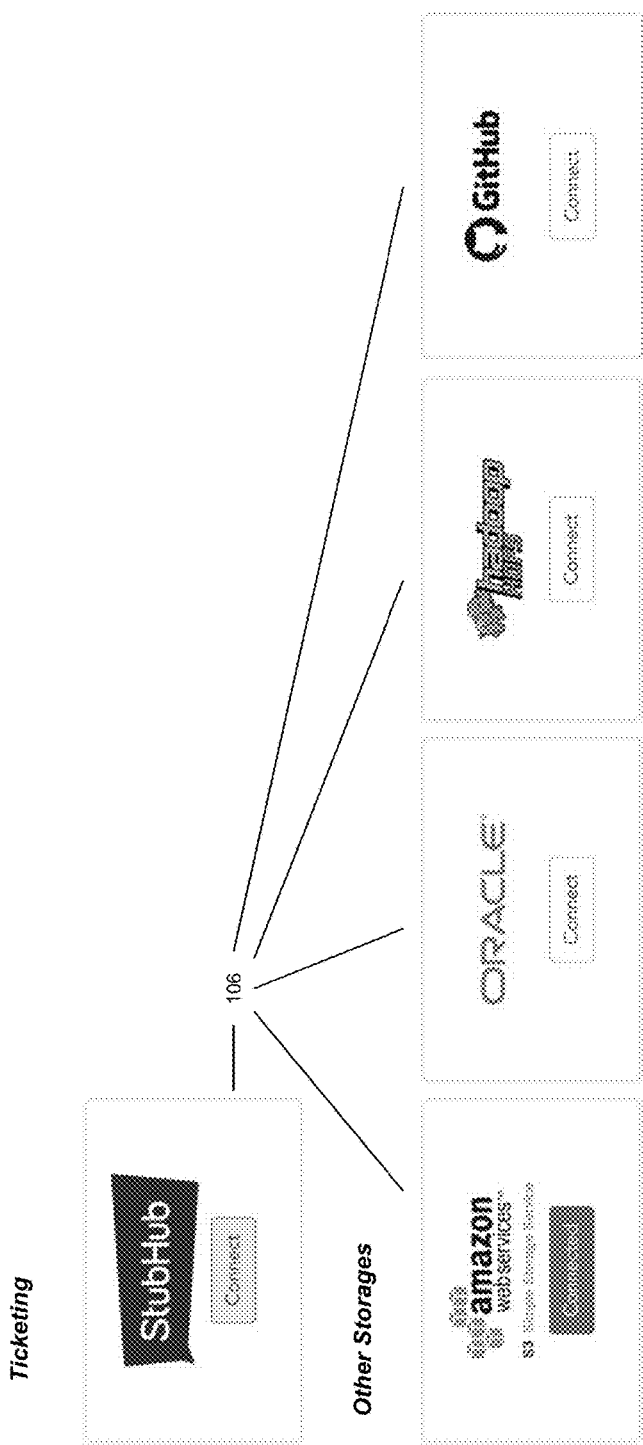
FIG. 4 is a screen capture of a user interface for selecting various data sources for the machine learning lifecycle management platform of FIG. 1 in accordance with various embodiments of the invention.

Selecting the "collector" option from the toolbar 304 instantiates a data collector module which is represented in the as collector node 308. Tasks associated with collecting data from static storage services using the are represented by the data collection node 308, and typically begin the overall workflow process. FIG. 4 illustrates a set of exemplary data sources 106, including proprietary, special purpose data storage sources (e.g., ticket sales or ticket availability from StubHub) as well as more generic persistent data stores such as Oracle, Hadoop, AWS and others. The dataset service 156 maintains connectivity, schema and other parameters related to the sources 106.

Figure 5:
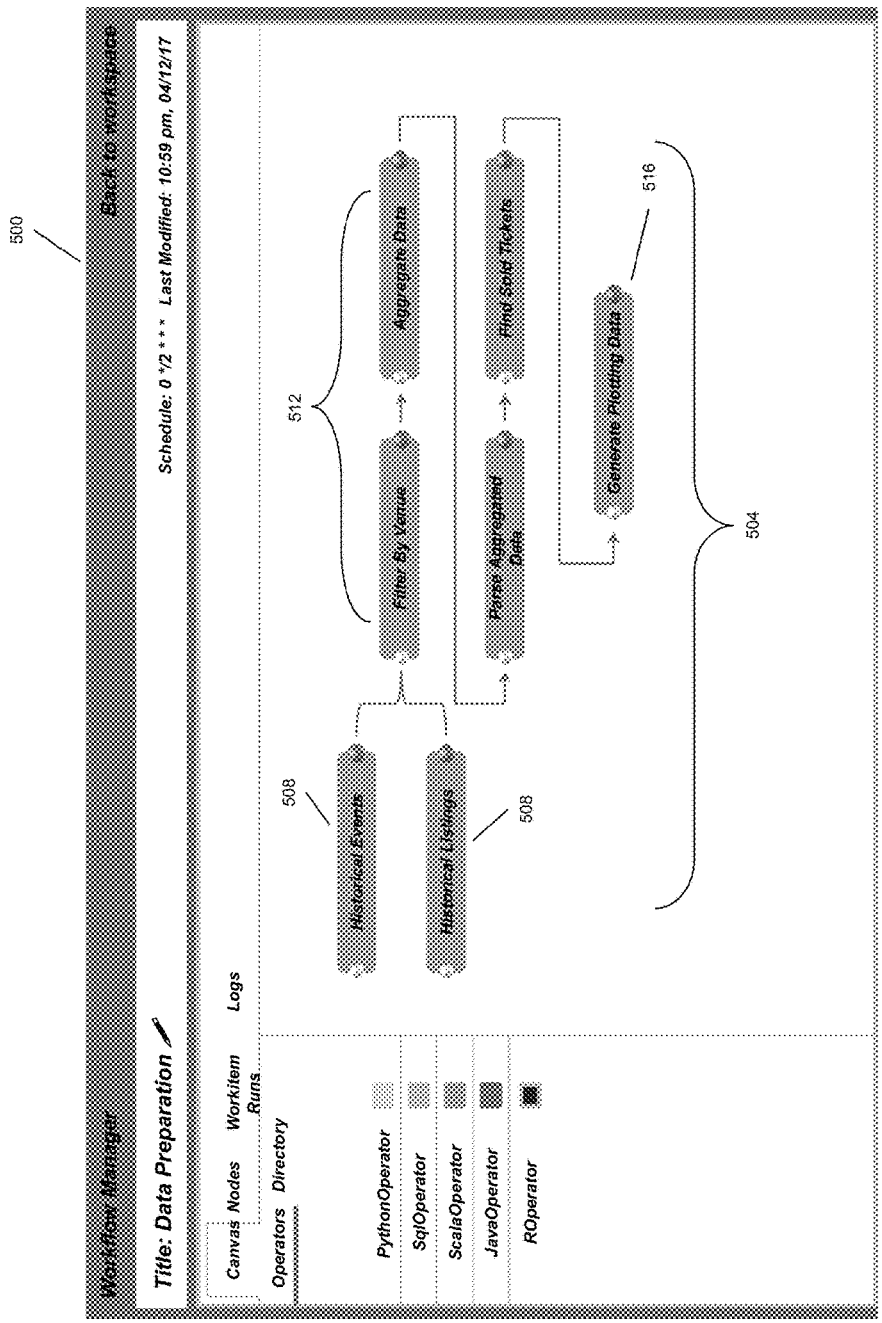
FIG. 5 is a screen capture of a user interface for building a directed graph of project tasks managed within the machine learning lifecycle management platform of FIG. 1 in accordance with various embodiments of the invention.

Referring back to FIG. 3, selecting the workflow manager button from toolbar 304 instantiates a workflow module, represented as a workflow manager node 312 for processing the data prior to its use in training and executing the model or data analytics plan as described above. Referring to FIG. 5, a secondary user interface 500 (or "process canvas")

facilitates the creation, modification and management of an acyclic directed graph 504 comprised of specific data processing tasks that are executed against the data collected by the dataset service 156. Each task is represented as a node in the graph 504. The tasks execute processes such as data ingestion (508), filtering, aggregation, selection, and data parsing (512), and graphical data output (516), and can be provided as computer-executable code in the form of SQL, Python, Scala, java, and other programming and scripting languages.

Referring now to FIG. 6, each of the tasks (or groupings of tasks) can be assigned to a particular machine. In certain embodiments, selecting a particular node from FIG. 3 presents the user interface 600, with the name of the task or node identified in text box 604. The user may enter text describing the process in text box 608, and use a selector tool 612 to select a particular machine type to execute the task, including the number of CPUs and amount of RAM associated with each type of machine. For example, a simple SQL script filtering out unnecessary data may be assigned to a small machine with a single CPU and 1 GB of RAM, whereas a complex deep-learning algorithm may be assigned to a GPU machine. In addition to selecting a particular machine, users may select other configuration options using controls 616 such as scheduling the job ("chron" parameters), and email notifications.

Referring again to FIG. 3, selecting the RT-Streamer button from the toolbar 304 instantiates a real time data collection module represented as a data collection node and/or a real time streamer node 320, which when executed connect to a designated streaming service and provides real-time transactional data for predictor nodes executing various data models.

Selecting the trainer button from the toolbar 304 instantiates a trainer module represented as a trainer node 324. The trainer module trains model parameters based on the imported and received data by, for example, executing stored code, and, in some cases, imports a prebuilt model into the system. For example, the trainer module may import a model from SAS, TensorFlow, Jupyter, Spark ML and/or R. Selecting the predictor button from the toolbar 304 instantiates a prediction module represented as a predictor node 328. Selecting the publisher button instantiates a publisher module represented as a predictor node 332. The publisher module operates in one of two modes—caching mode and direct serving mode. In direct serving mode, trainer module is paired with the publisher module, which gets input features from the client and returns the prediction result. In caching mode, trainer is paired with a prediction module, which periodically calculates the state of each model and caches the results. The publisher module then only needs to access the cache to provide results for subsequent client requests. Caching mode is useful, for example, when using streaming data services to provide near real-time data to the system.

In some embodiments, users can select the challenger button from toolbar 304, which when selected instantiates a challenger module represented by a challenger node 336. The challenger module provides model testing and comparison functionality such that data streams can be split across different models, run in parallel, and/or sequentially. For example, in some embodiments, the challenger module provides for split testing, bucket testing, or other forms of AB testing of various models for different model experimentations. In some instances, users can request and specify which model instances to target with specific data sets and data sources. For example, different model instances can represent different experimentations and improvements in existing algorithms or using a different modeling or predictive methodology.

In some cases, a user may specify a preference list among models to be used, and/or coordinate use of different models to test out responsiveness metrics. As an example, if a user is modeling delivery algorithms for food delivery services, the different models can be tested until a particular service level (e.g., all deliveries within thirty minutes) is met. In another example, different pricing models for ride services (e.g., Lyft, Uber) or secondary ticket markets (e.g., StubHub) can be tested against each other until an optimal pricing model is arrived at.

In some cases, user requests can be sent to model instances in parallel or in a sequential manner. In parallel case, after one model meets a certain threshold, that model and its results are sent to the client and/or published. If the user organizes the models to be executed sequentially and one model times out, the request is sent to the next model, or in other instances, data can be sent to a certain model with a delay parameter indicating at what point in time or data usage parameter the process switches to an alternate model. In some instances, key performance indices of each model are provided to the user as to monitor the performance of each model and, if necessary disable models that are not performing as expected. In other cases, users may allocate a certain percentage (either globally or based on selective parameters) of the dataset being modeled to different models—e.g., 25% of the data sent to model A, 25% to model B, and 50% to model C, and each stream executed in parallel and/or sequential as described above.

Figure 7:
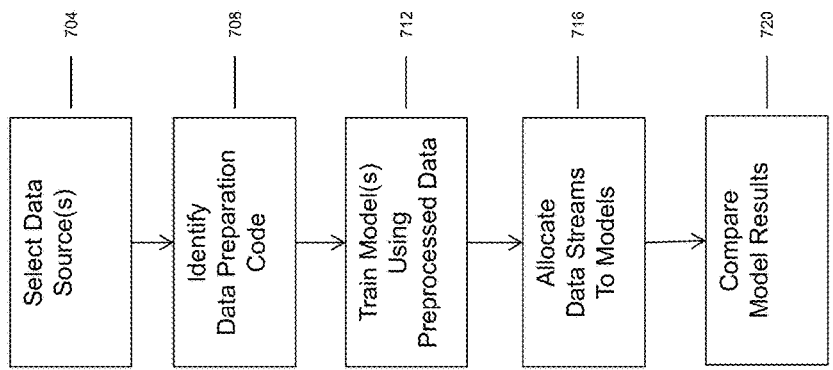
FIG. 7 is flow chart of a method for managing execution of a machine learning process in accordance with various embodiments of the invention.

FIG. 7 provides a flowchart outlining one embodiment of a method provided by the instant invention. A user selects one or more data sources (STEP 704), comprised of static data sets, third party data sources, real time data streams, etc. to be used in the modeling exercise. Data preparation code (e.g., SQL, Python, etc.) is identified (STEP 708) and imported or copied into the workflow process tasks to clean, normalize and select the data to be used for the modeling. Individual models are then trained (STEP 712) using the processed data to create the various data models. Data is then allocated to the various models (STEP 716) and compared (STEP 720) using the comparator module (as described above).

Figure 8:
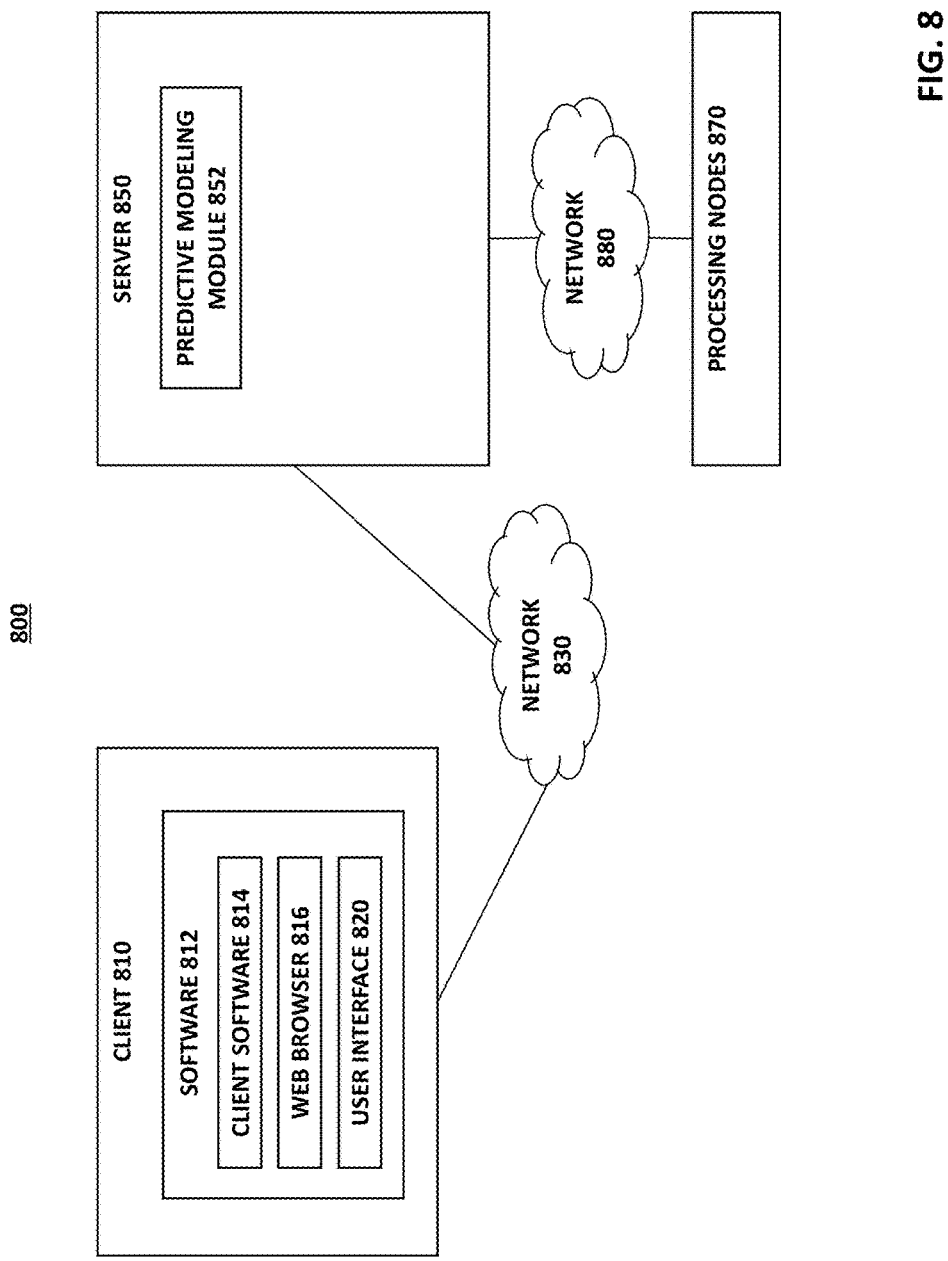
FIG. 8 is another schematic of a machine learning lifecycle management system in accordance with various embodiments of the invention.

Referring to FIG. 8, in some embodiments, a machine learning lifecycle management system 800 (e.g., an embodiment of system 100) includes at least one client computer 810, at least one server 850, and one or more processing nodes 870. The illustrative configuration is only for exemplary purposes, and it is intended that there can be any number of clients 810 and/or servers 850.

In some embodiments, machine learning lifecycle management system 800 may perform one or more (e.g., all) steps of methods described herein and outlined in FIG. 7. In some embodiments, client 810 may implement user interfaces 200, 300, 500 and 600, and the modeling module 852 of server 850 may implement other components of the machine learning lifecycle management system 100. However, embodiments are not limited by the manner in which the components of the machine learning lifecycle management system 100 or modeling method 700 are distributed between client 810, server 850, and one or more processing nodes 870. Furthermore, in some embodiments, all components of the machine learning lifecycle management system 100 may be implemented on a single computer (instead of being distributed between client 810, server 850, and processing node(s) 870), or implemented on two computers (e.g., client 810 and server 850).

One or more communications networks 830 connect the client 810 with the server 850, and one or more communications networks 880 connect the serer 850 with the processing node(s) 870. The communication may take place via any media such as standard telephone lines, LAN or WAN links (e.g., T1, T3, 56 kb, X.25), broadband connections (ISDN, Frame Relay, ATM), and/or wireless links (IEEE 802.11, Bluetooth). Preferably, the networks 830/880 can carry TCP/IP protocol communications, and data (e.g., HTTP/HTTPS requests, etc.) transmitted by client 810, server 850, and processing node(s) 870 can be communicated over such TCP/IP networks. The type of network is not a limitation, however, and any suitable network may be used. Non-limiting examples of networks that can serve as or be part of the communications networks 830/880 include a wireless or wired Ethernet-based intranet, a local or wide-area network (LAN or WAN), and/or the global communications network known as the Internet, which may accommodate many different communications media and protocols.

The client 810 is preferably implemented with software 812 running on hardware. In some embodiments, the hardware may include a personal computer (e.g., a PC with an INTEL processor or an APPLE MACINTOSH) capable of running such operating systems as the MICROSOFT WINDOWS family of operating systems from Microsoft Corporation of Redmond, Wash., the MACINTOSH operating system from Apple Computer of Cupertino, Calif., and/or various varieties of Unix, such as SUN SOLARIS from SUN MICROSYSTEMS, and GNU/Linux from RED HAT, INC. of Durham, N.C. The client 810 may also be implemented on such hardware as a smart or dumb terminal, network computer, wireless device, wireless telephone, information appliance, workstation, minicomputer, mainframe computer, personal data assistant, tablet, smart phone, or other computing device that is operated as a general purpose computer, or a special purpose hardware device used solely for serving as a client 810.

Generally, in some embodiments, clients 810 can be operated and used for various activities including sending and receiving messages, requesting and viewing content available over the World Wide Web, participating in chat rooms, or performing other tasks commonly done using a computer, handheld device, or cellular telephone. Clients 810 can also be operated by users on behalf of others, such as employers, who provide the clients 810 to the users as part of their employment.

In various embodiments, the software 812 of client computer 810 includes client software 814 and/or a web browser 816. The web browser 814 allows the client 810 to request a web page or other downloadable program, applet, or document (e.g., from the server 850) with a web-page request. One example of a web page is a data file that includes computer executable or interpretable information, graphics, sound, text, and/or video, that can be displayed, executed, played, processed, streamed, and/or stored and that can contain links, or pointers, to other web pages. Examples of commercially available web browser software 816 are INTERNET EXPLORER, offered by Microsoft Corporation, NETSCAPE NAVIGATOR, offered by AOL/Time Warner, FIREFOX offered the Mozilla Foundation, or CHROME offered by Google. In some embodiments, web browser software 816 and/or client software 814 may allow the client to access the user interfaces described above for the machine learning lifecycle management system 100.

The server 850 interacts with the client 810. The server 850 is preferably implemented on one or more server-class computers that have sufficient memory, data storage, and processing power and that run a server-class operating system (e.g., SUN Solaris, GNU/Linux, and the MICROSOFT WINDOWS family of operating systems). System hardware and software other than that specifically described herein may also be used, depending on the capacity of the device and the size of the user base. For example, the server 850 may be or may be part of a logical group of one or more servers such as a server farm or server network. As another example, there may be multiple servers 850 associated with or connected to each other, or multiple servers may operate independently, but with shared data. In a further embodiment and as is typical in large-scale systems, application software can be implemented in components, with different components running on different server computers, on the same server, or some combination.

Although examples provided herein may have described modules as residing on separate computers or operations as being performed by separate computers, it should be appreciated that the functionality of these components can be implemented on a single computer, or on any larger number of computers in a distributed fashion.

The above-described embodiments may be implemented in any of numerous ways. For example, the embodiments may be implemented using hardware, software or a combination thereof. When implemented in software, the software code can be executed on any suitable processor or collection of processors, whether provided in a single computer or distributed among multiple computers. Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, some embodiments may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments discussed above. The computer readable medium or media may be non-transitory. The computer readable medium or media can be transportable, such that the program or programs stored thereon can be loaded onto one or more different computers or other processors to implement various aspects of predictive modeling as discussed above. The terms "program" or "software" are used herein in a generic sense to refer to any type of computer code or set of computer-executable instructions that can be employed to program a computer or other processor to implement various aspects described in the present disclosure. Additionally, it should be appreciated that according to one aspect of this disclosure, one or more computer programs that when executed perform predictive modeling methods need not reside on a single computer or processor, but may be distributed in a modular fashion amongst a number of different computers or processors to implement various aspects of predictive modeling.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish a relationship between data elements.

Also, predictive modeling techniques may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

In some embodiments the method(s) may be implemented as computer instructions stored in portions of a computer's random access memory to provide control logic that affects the processes described above. In such an embodiment, the program may be written in any one of a number of high-level languages, such as FORTRAN, PASCAL, C, C++, C#, Java, javascript, Tcl, or BASIC. Further, the program can be written in a script, macro, or functionality embedded in commercially available software, such as EXCEL or VISUAL BASIC. Additionally, the software may be implemented in an assembly language directed to a microprocessor resident on a computer. For example, the software can be implemented in Intel 80×86 assembly language if it is configured to run on an IBM PC or PC clone. The software may be embedded on an article of manufacture including, but not limited to, "computer-readable program means" such as a floppy disk, a hard disk, an optical disk, a magnetic tape, a PROM, an EPROM, or CD-ROM.

Various aspects of the present disclosure may be used alone, in combination, or in a variety of arrangements not specifically described in the foregoing, and the invention is therefore not limited in its application to the details and arrangement of components set forth in the foregoing description or illustrated in the drawings. For example, aspects described in one embodiment may be combined in any manner with aspects described in other embodiments.

What is claimed is:

1. A system for executing data analytics, the system comprising:
   one or more processors; and
   a memory coupled with the one or more processors, wherein the processor executes a plurality of modules stored in the memory, and wherein the plurality of modules comprises:
      a user interface for modeling and managing a data analytics plan, the user interface displaying a plurality of processing nodes, the processing nodes comprising one or more collector nodes, one or more workflow manager nodes, one or more training nodes, one or more predictor nodes and one or more challenger nodes;
      a collector module, for accessing one or more data sources, each data source providing data for use in training and executing the data analytics plan, each instantiation of which is presented as one of the one or more collector nodes in the user interface;
      a workflow module, for processing the data prior to its use in training and executing the data analytics plan, each instantiation of which is presented as one of the one or more workflow manager nodes in the user interface;
      a training module, for training one or more data analytics models using the processed data, each instantiation of which is presented as one of the one or more training manager nodes in the user interface;
      a predictor module, for producing one or more predictive datasets based at least in part on the one or more data analytics models, each instantiation of which is presented as one of the one or more predictor nodes in the user interface; and
      a challenger module, for executing multi-sample hypothesis testing of the data analytics models, each instantiation of which is presented as one of the one or more challenger nodes in the user interface, the multi-sample hypothesis testing comprising executing two or more of the data analytics models, wherein executing two or more of the data analytics models comprises:
      receiving a first request in the user interface indicative of allocation of a first subset of the data to a first of the two or more models, and
      receiving a second request in the user interface indicative of a second subset of the data to a second of the two or more models.

2. The system of claim 1 further comprising a publishing module, for publishing results calculated by the predictor module, wherein each instantiation of the publishing module is presented as a publisher node in the user interface.

3. The system of claim 1 wherein the one or more data sources comprise at least one static data source accessed using an application programming interface to an external computing system.

4. The system of claim 1 wherein the one or more data sources comprise at least one real-time data streaming source.

5. The system of claim 1 wherein the workflow module implements a series of tasks, each task performing a discrete operation on the data.

6. The system of claim 5 wherein the discrete operation is selected from a group comprising data filtering, data aggregation, data selection, data parsing and data normalization.

7. The system of claim 5 further comprising a subordinate user interface in which a directed acyclic graph is constructed comprising tasks represented by vertices in the directed acyclic graph and possible paths of the data represented as edges in the directed acyclic graph.

8. The system of claim 5 wherein each instance of the workflow module is assigned to a specified processor such that the series of tasks associated with the instance of the workflow module are executed on the specified processor.

9. The system of claim 8 wherein the specified processor is selected automatically based at least in part on an estimated data processing load of the series of tasks.

10. The system of claim 1 wherein the allocation of the data to the two or more models comprises allocating a percentage of the data to each of the two or more models.

11. The system of claim 1 wherein the allocation of the data to the two or more models comprises allocating all of the data to a first model and, upon receiving an indication the first model is not performing, sending all of the data to a second model.

12. The system of claim 1 wherein the allocation of the data to the two or more models comprises allocating all of the data to each model in parallel and designating a priority for at least one of the two or more models.

13. A method for implementing data analytics models, the method comprising:
   displaying, on a user interface for modeling and managing a data analytics plan, a plurality of processing nodes, the processing nodes comprising one or more collector nodes, one or more workflow manager nodes, one or more training nodes, one or more predictor nodes and one or more challenger nodes;
   accessing one or more data sources, each data source providing data for use in training and executing the data analytics plan, and presenting each data source as one of the one or more collector nodes in the user interface;
   processing the data prior to its use in training and executing the data analytics plan, and presenting each processing step as one of the one or more workflow manager node in the user interface;
   training one or more data analytics models using the processed data, and presenting each training step as one of the one or more training manager nodes in the user interface;
   producing one or more predictive datasets based at least in part on the one or more data analytics models, and presenting each production step as one of the one or more predictor nodes in the user interface; and
   executing multi-sample hypothesis testing of the data analytics models, and presenting each testing step as one of the one or more challenger nodes in the user interface, the multi-sample hypothesis testing comprising executing two or more of the data analytics models, wherein executing two or more of the data analytics models comprises:
      receiving a first request in the user interface indicative of allocation of a first subset of the data to a first of the two or more models, and
      receiving a second request in the user interface indicative of a second subset of the data to a second of the two or more models.

14. The method of claim 13 further comprising publishing the predictive datasets, and presenting each publishing step as a publisher node in the user interface.

15. The method of claim 13 wherein the one or more data sources comprise at least one static data source accessed using an application programming interface to an external computing system.

16. The method of claim 13 wherein the one or more data sources comprise at least one real-time data streaming source.

17. The method of claim 13 wherein processing the data prior to its use in training and executing the data analytics plan comprises a series of tasks, each task performing a discrete operation on the data.

18. The method of claim 17 wherein the discrete operation is selected from a group comprising data filtering, data aggregation, data selection, data parsing and data normalization.

19. The method of claim 17 further comprising displaying a subordinate user interface in which a directed acyclic graph is constructed comprising tasks represented by vertices in the directed acyclic graph and possible paths of the data represented as edges directed acyclic graph.

20. The method of claim 17 wherein the series of tasks are assigned to a specified processor such that the series tasks associated with the instance of the workflow module are executed on the specified processor.

21. The method of claim 20 wherein the specified processor is assigned by a human.

22. The method of claim 20 wherein the specified processor is selected automatically based at least in part on an estimated data processing load of the series of tasks.

23. The method of claim 13 wherein the allocation of the data to the two or more models comprises allocating a percentage of the data to each of the two or more models.

24. The method of claim 13 wherein the allocation of the data to the two or more models comprises allocating all of the data to a first model and, upon receiving an indication the first model is not performing, sending all of the data to a second model.

25. The method of claim 13 wherein the allocation of the data to the two or more models comprises allocating all of the data to each model in parallel and designating a priority for at least one of the two or more models.

26. An article of manufacture having computer-readable instructions stored thereon for:
   a user interface for modeling and managing a data analytics plan, the user interface displaying a plurality of processing nodes, the processing nodes comprising one or more collector nodes, one or more workflow manager nodes, one or more training nodes, one or more predictor nodes and one or more challenger nodes;
   a collector module, for accessing one or more data sources, each data source providing data for use in training and executing the data analytics plan, each instantiation of which is presented as one of the one or more collector nodes in the user interface;
   a workflow module, for processing the data prior to its use in training and executing the data analytics plan, each instantiation of which is presented as one of the one or more workflow manager nodes in the user interface;
   a training module, for training one or more data analytics models using the processed data, each instantiation of which is presented as one of the one or more training manager nodes in the user interface;
   a predictor module, for producing one or more predictive datasets based at least in part on the one or more data analytics models, each instantiation of which is presented as one of the one or more predictor nodes in the user interface; and a challenger module, for executing multi-sample hypothesis testing of the data analytics models, each instantiation of which is presented as one of the one or more challenger nodes in the user interface, the multi-sample hypothesis testing comprising executing two or more of the data analytics models, wherein executing two or more of the data analytics models comprises:

receiving a first request in the user interface indicative of allocation of a first subset of the data to a first of the two or more models, and receiving a second request in the user interface indicative of a second subset of the data to a second of the two or more models.

* * * * *